Patented Jan. 6, 1953

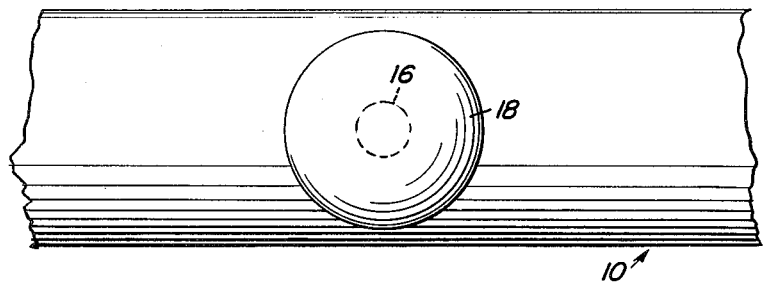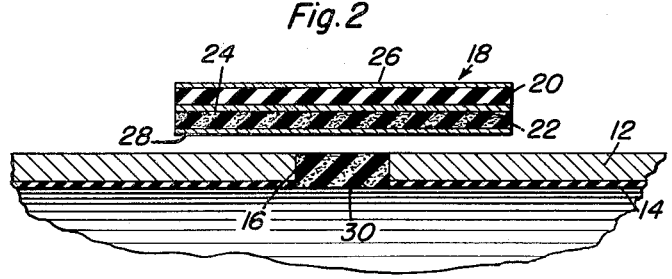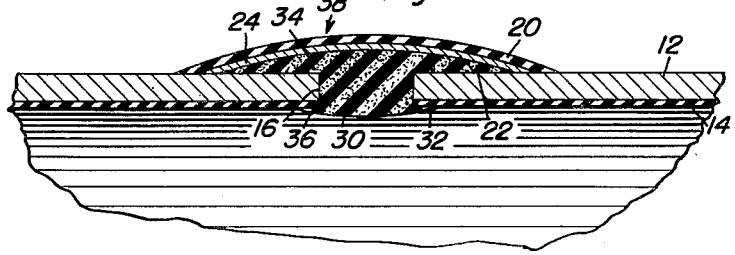

2,624,689

UNITED STATES PATENT OFFICE 2,624,689

METHOD AND COMPOSITION FOR REPAIRING FIRE HOSES

Wilhelm F. Peters, Frankfort-on-the-Main-Niederursel, and Josef Riesinger, Frankfort-on-the-Main, Germany, assignors to Valex J. Delhomme, New York, N. Y.

Application December 7, 1950, Serial No. 199,624

3 Claims. (Cl. 154—104)

This invention relates to a method and composition or article for repairing pressure hoses.

Hoses, such as fire hoses in particular, which are adapted to convey fluid under substantial pressure, are usually fabricated on a strong fabric or textile outer layer which is rubberized on its inner surface, or impregnated in some other way in order to render it impermeable to water.

Conventionally, when an injury appears in such hoses and they begin to leak, the hose is repaired by fitting clamps to the injured or damaged area or by winding the hose with strips of non-porous sheet material. Such repairs are, however, generally only possible in the case of small injuries, are not permanent and substantially interfere with the coiling of the hose when not required for use. When the injury to the hose is comparatively large, it is the conventional practice to cut the hose and shorten it or reject the hose entirely.

It is the primary object of this invention to provide a process and article or composition which makes it possible to repair pressure hoses having an outer layer of textile material in a simple and very permanent manner even when the injury is comparatively large. The present invention accomplishes such repair by the use of a laminated rubber patch which is reinforced with an intermediate fabric layer, the patch being applied to the outer textile surface of the hose at the injured area and vulcanized on the hose by means of heat and pressure.

It is well known to repair tires and inner tubes employed in automotive vehicles by vulcanizing a rubber patch on the tube or tire. In this case the vulcanization is practicable because the rubber patch is applied directly to a rubber body so that, on vulcanization, a homogeneous connection between two bodies of the same material is produced. On the other hand, in hoses which are subject to relatively high fluid pressure and which consist of an outer envelope or layer of textile material, it is not possible to directly vulcanize a rubber patch on the outer textile layer because the simple rubber patch will not remain permanently adherent on the hose and will not withstand the fluid pressure within the hose. The fluid pressure within the hose will cause the rubber patch to bulge and eventually will break the bond between the rubber patch and the outer textile layer of the pressure hose. By the present invention, a particular type of reinforced rubber patch is employed which when vulcanized over the injured area on the outer textile surface of the hose will form a very secure and permanent bond therewith which will withstand the high internal fluid pressures in the hose.

The details of the process and the article or composition making up the patch will be described herein in connection with the accompanying drawings wherein:

Figure 1 is a top plan view of a portion of a pressure hose with the present patch applied thereto;

Figure 2 is an enlarged fragmentary group sectional view of the hose and the patch;

Figure 3 is a view similar to Figure 2 showing the patch vulcanized upon the hose.

When referring to the drawings, similar reference characters will be employed for corresponding elements throughout. Indicated generally at 10 is a conventional pressure hose, such as a fire hose, which includes an outer layer or envelope 12 of a suitable textile material, such as canvas or woven fibres of manila, hemp, ramie and the like. The outer fabric layer 12 is conventionally rubberized to produce an inner rubber layer 14 which is water impermeable. In certain constructions of pressure hoses, the inner layer of 14 may be raw rubber, a compound rubber, or a plastic material which is water impermeable.

Assuming that the hose 10 has been injured so that a hole 16 is formed through the wall thereof, the present invention contemplates repairing the hose at the area surrounding the hole by providing a patch 18 which may be of any desired configuration but preferably circular.

The patch 18 is in the form of a laminated article having an outermost rubber layer 20 and then innermost rubber layer 22 joined by an intermediate fabric layer 24. The outer and inner layers 20 and 22 are fabricated of special rubber compositions as will be described hereinafter, and the intermediate fabric layer 24 may be made of canvas or other woven fibres such as the textile material used as the outer layer or envelope 12 of the pressure hose 10. Inasmuch as the innermost layer 22 is to be attached by vulcanization to the outer layer 12 of the hose, and will constitute the binding surface, it is fabricated of an easily flowable rubber composition while the outermost layer 20 which constitutes the cover of the patch will consist of a composition which is less readily flowable. The rubber layers 20 and 22 may be provided with removable coatings 26 and 28 of cellulose hydrate, paper or the like, which will prevent the rubber layers from drying out and increase the durability of the patches. The removable coatings applied to opposite sides of the patch can be of different material and/or color in order to render the different rubber layers recognizable, but the rubber layers themselves may be of different colors.

Before use, the coatings 26 and 28 are removed, the patch applied to the injured area upon the outer layer 12 of the hose and vulcanized thereon by heat and pressure. For the type of rubber compositions employed as the layers 20 and 22, it has been found that the vulcanization should be carried out at temperatures of 140–150° C. and under 30 to 40 pounds per square inch of pressure. Conventional vulcanizing apparatus is employed, and it has been found that the reinforced patch 18 will form a secure and permanent bond with the hose which will not burst or tend to belly out under the action of the fluid pressure in the hose at the location of the patch.

While the above process can be used to advantage in repairing cracks in the walls of pressure hoses, the process can be varied to repair sizable holes in the walls of the pressure hose as clearly illustrated in Figures 2 and 3 of the drawings. A rubber plug 30 fabricated of raw rubber, either natural or synthetic, is cut to the size of the hole and positioned therein as shown clearly in the drawings. When the patch 18 is applied upon the outer textile layer 12 of the hose and over one face of the plug 30, the patch can be vulcanized under heat and pressure. This vulcanization causes the inner face of the plug 30 to flow and weld as at 32 to the inner rubberized layer 14 of the pressure hose and also causes the innermost rubber layer 22 of the patch to fuse with the outer layer of the plug 30 as at 34. At the same time, the peripheral face of the plug fuses or welds as at 36 to the edge of the rubberized layer 14 of the hose forming the outer wall of the aperture or hole 16. The result, in effect, is the production of a double-headed, fused, rubber rivet with the outer head 38 abutting the textile outer layer 12 of the hose consisting of a laminated material having inner and outer layers of rubber 20 and 22 and an intermediate fabric layer 24. It is readily apparent that the patch, as shown clearly in Figure 3, vulcanized on the hose forms a permanent bond with the hose which is exceptionally durable, which will not strip off, and which will not bulge under the action of the fluid pressure in the hose at the patch.

As stated earlier, the rubber layers 20 and 22 of the patch 18 are fabricated of special rubber compositions, the innermost layer 22 being somewhat more flowable at the temperatures and pressures of vulcanization than the outermost layer 20. The outermost rubber layer 20 comprises the following composition:

Example I 45.0–55.0 lbs. smoked sheets of natural rubber or sheets of "Buna S," or one-half smoked sheets and one-half "Buna S"
2.0–2.4 lbs. spindle oil
0.80–1.10 lbs. phenyl naphthylamine
0.80–1.10 lbs. colophony
0.70–0.90 lb. stearic acid
1.40–1.80 lbs. sulphur
4.50–5.30 lbs. zinc oxide
14.20–15.20 lbs. chalk
14.20–15.20 lbs. heavy spar
0.10–0.20 lb. lampblack
0.65–0.80 lb. 2-mercaptobenzothiazole
0.025–0.100 lb. tetramethylthiuram disulphide
7.00–7.60 lbs. mixture by weight of 30% zinc sulphide, 60% barium sulfate, and 10% zinc oxide The innermost rubber layer 22 of the patch 18 comprises the following composition:

Example II 50.0–60.0 lbs. smoked sheets or "Buna S" or one-half smoked sheets and one-half "Buna S"
2.20–2.50 lbs. spindle oil
0.90–1.30 lbs. colophony
0.70–0.90 lb. stearic acid
1.40–1.80 lbs. sulphur
4.50–5.50 lbs. zinc oxide
14.00–16.00 lbs. chalk
14.00–16.00 lbs. heavy spar
0.65–0.80 lb. 2-mercaptobenzothiazole
0.025–0.100 lb. tetramethylthiuram disulphide
0.90–1.30 lbs. aldolalphanaphthylamine
7.00–7.60 lbs. mixture by weight of 30% zinc sulphide, 60% barium sulfate, and 10% zinc oxide If it is desired that the rubber layers 20 and 22 be distinguishable so that one could ascertain which layer to place upon the textile layer 12 of the pressure hose, 0.30–0.50 lb. of a suitable organic red pigment may be added to the above composition employed for fabricating the innermost layer 22.

It will be understood that "Buna S" is the commercial name for a rubbery copolymer of butadiene and styrene.

Thus it will be seen that a novel process and article or composition is provided for readily and easily repairing pressure hoses adapted to convey fluids under pressure, which pressure hoses conventionally include outer textile layers and inner rubberized layers. The process and article is such that large as well as small injuries in the pressure hose can be readily repaired by vulcanization under heat and pressure to provide a patch which forms a very secure and more or less permanent bond with the hose which will not strip off or bulge due to the internal fluid pressure in the pressure hose. While a preferred embodiment of the invention has been shown and described hereinabove, it will be understood that one skilled in the art may make minor variations in the process and the article or composition without departing from the spirit of the invention and the scope of the appended claims.

Having described the invention, what is claimed as new is:

1. A process of repairing a hose having an outer textile layer and an inner rubber layer and adapted to convey fluid under pressure comprising applying a reinforced rubber patch to the outer layer at the injured area and vulcanizing the patch on the hose by heat and pressure, said patch being laminated and including two outer layers of rubber separated by an intermediate layer of textile material, the outermost rubber layer of the patch comprising 45.0–55.0 lbs. rubbery sheets from the group consisting of smoked natural rubber and a copolymer of butadiene and styrene, 2.0–2.4 lbs. spindle oil, 0.8–1.1 lbs. phenyl naphthylamine, 0.8–1.1 lbs. colophony, 0.7–0.9 lb. stearic acid, 1.4–1.8 lbs. sulphur, 4.5–5.3 lbs. zinc oxide, 14.2–15.2 lbs. chalk, 14.2–15.2 lbs. heavy spar, 0.1–0.2 lb. lampblack, 0.65–0.80 lb. 2-mercaptobenzothiazole, 0.025–0.100 lb. tetramethylthiuram disulphide, and 7.0–7.6 lbs. of a mixture by weight of 30% zinc sulphide, 60% barium sulfate, and 10% zinc oxide.

2. The process of claim 1 wherein the other of said outer rubber layers of the patch comprises 50.0–60.0 lbs. rubbery sheets from the group consisting of smoked natural rubber and a copolymer of butadiene and styrene, 2.2–2.5 lbs. spindle oil, 0.90–1.30 lbs. colophony, 0.70–0.90 lb. stearic acid, 1.4–1.8 lbs. sulphur, 4.5–5.5 lbs. zinc oxide, 14.0–16.0 lbs. chalk, 14.0–16.0 lbs. heavy spar, 0.65–0.80 lb. 2-mercaptobenzothiazole, 0.025–0.100 lb. tetramethylthiuram disulphide, 0.90–1.30 lbs. aldolalphanaphthylamine, and 7.0–7.6 lbs. of a mixture by weight of 30% zinc sulfide, 60% barium sulfate, and 10% zinc oxide.

3. An article of manufacture comprising a reinforced rubber patch for repairing pressure hoses, said patch being laminated and including outer layers of rubber separated by an intermediate fabric layer, one of said outer layers comprising 45.0–55.0 lbs. rubbery sheets from the group consisting of smoked natural rubber and a copolymer of butadiene and styrene, 2.0–2.4 lbs. spindle oil, 0.8–1.1 lbs. phenylnaphthylamine, 0.8–1.1 lbs. colophony, 0.7–0.9 lb. stearic acid, 1.4–1.8 lbs. sulphur, 4.5–5.3 lbs. zinc oxide, 14.2–15.2 lbs. chalk, 14.2–15.2 lbs. heavy spar, 0.1–0.2 lb. lampblack, 0.65–0.80 lb. 2-mercaptobenzothiazole, 0.025–0.100 lb. tetramethylthiuram disulphide, and 7.0–7.6 lbs. of a mixture by weight of 30% zinc sulphide, 60% barium sulfate, and 10% zinc oxide, the other rubber layer comprises 50.0–60.0 lbs. rubbery sheets from the group consisting of smoked natural rubber and a copolymer of butadiene and styrene, 2.2–2.5 lbs. spindle oil, 0.90–1.30 lbs. colophony, 0.70–0.90 lb. stearic acid, 1.4–1.8 lbs. sulphur, 4.5–5.5 lbs. zinc oxide, 14.0–16.0 lbs. chalk, 14.0–16.0 lbs. heavy spar, 0.65–0.80 lb. 2-mercaptobenzothiazole, 0.025–0.100 lb. tetramethylthiuram disulphide, 0.90–1.3 lbs. aldolalphanaphthylamine, and 7.0–7.6 lbs. of a mixture by weight of 30% zinc sulfide, 60% barium sulfate, and 10% zinc oxide.

WILHELM F. PETERS.
JOSEF RIESINGER.

REFERENCES CITED

The following references are of record in the file of this patent:

UNITED STATES PATENTS

| Number | Name | Date |
|---|---|---|
| 1,290,128 | Duffy | Jan. 7, 1919 |
| 1,591,817 | Hawkinson | July 6, 1926 |
| 2,101,607 | Block | Dec. 7, 1937 |
| 2,430,076 | Pollock | Nov. 7, 1947 |
| 2,537,908 | Pechukas | Jan. 9, 1951 |